US010689038B2

(12) United States Patent
Ikeda et al.

(10) Patent No.: US 10,689,038 B2
(45) Date of Patent: Jun. 23, 2020

(54) VEHICULAR PILLAR STRUCTURE

(71) Applicant: TOYOTA JIDOSHA KABUSHIKI KAISHA, Toyota-shi (JP)

(72) Inventors: Koki Ikeda, Toyota (JP); Motoya Sakabe, Nisshin (JP); Takuya Miura, Toyota (JP); Kazuyoshi Ogata, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 8 days.

(21) Appl. No.: 16/238,557

(22) Filed: Jan. 3, 2019

(65) Prior Publication Data

US 2019/0217900 A1    Jul. 18, 2019

(30) Foreign Application Priority Data

Jan. 16, 2018   (JP) .................................. 2018-005009

(51) Int. Cl.
| | | |
|---|---|---|
| *B62D 25/04* | (2006.01) | |
| *B60J 1/10* | (2006.01) | |
| *B62D 29/00* | (2006.01) | |
| *B62D 27/02* | (2006.01) | |

(52) U.S. Cl.
CPC ............... *B62D 25/04* (2013.01); *B60J 1/10* (2013.01); *B62D 27/026* (2013.01); *B62D 29/001* (2013.01)

(58) Field of Classification Search
CPC ................... B62D 25/04; B60J 1/10
See application file for complete search history.

(56) References Cited

U.S. PATENT DOCUMENTS

| 4,807,925 A * | 2/1989 | Sakamoto ............ B62D 23/005 |
| | | 296/193.06 |
| 5,941,596 A * | 8/1999 | See .......................... B60J 1/02 |
| | | 296/193.06 |
| 6,428,087 B1 * | 8/2002 | Frasher ................... B60R 21/04 |
| | | 296/146.1 |

(Continued)

FOREIGN PATENT DOCUMENTS

| JP | 63-142276 U | 9/1988 |
| JP | 2013-112077 | 6/2013 |

*Primary Examiner* — Gregory A Blankenship
(74) *Attorney, Agent, or Firm* — Oblon, McClelland, Maier & Neustadt, L.L.P.

(57) ABSTRACT

A vehicular pillar structure including:
  a first pillar which is included in a part of a front pillar, and extends along a generally upward and downward direction of a vehicle, and to which a front windshield glass is bonded;
  a second pillar which is included in another part of the front pillar, is arranged on a rear side of the vehicle at a predetermined spacing from the first pillar, and extends along a generally upward and downward direction of the vehicle;
  a transparent member with which the first pillar and the second pillar are bridged, and through which an exterior of the vehicle is visible from a driver side; and
  a molding which is disposed in at least a peripheral portion closer to the front windshield glass in the transparent member, and includes a bond portion that attaches the transparent member to at least the first pillar, and a closure portion that closes a gap between the transparent member and the front windshield glass is provided.

4 Claims, 4 Drawing Sheets

(56) References Cited

U.S. PATENT DOCUMENTS

| | | | | |
|---|---|---|---|---|
| 9,963,173 | B2* | 5/2018 | Toyota | B62D 25/04 |
| 10,065,581 | B2* | 9/2018 | Terada | B60R 13/08 |
| 2011/0248525 | A1* | 10/2011 | Lundstroem | B62D 25/04 |
| | | | | 296/191 |
| 2018/0273103 | A1* | 9/2018 | Komoriya | B62D 29/005 |
| 2018/0273104 | A1* | 9/2018 | Ikeda | B62D 25/04 |
| 2018/0273106 | A1* | 9/2018 | Ikeda | B60J 1/02 |
| 2019/0039553 | A1* | 2/2019 | Komura | B60H 1/265 |
| 2019/0126985 | A1* | 5/2019 | Ikeda | B62D 25/04 |
| 2019/0152419 | A1* | 5/2019 | Tanaka | B60R 21/04 |
| 2019/0217899 | A1* | 7/2019 | Ikeda | B62D 25/04 |
| 2019/0217900 | A1* | 7/2019 | Ikeda | B62D 25/04 |
| 2019/0225275 | A1* | 7/2019 | Miura | B60J 1/06 |
| 2019/0233018 | A1* | 8/2019 | Tanaka | B60R 21/213 |

* cited by examiner

VEHICULAR PILLAR STRUCTURE

CROSS-REFERENCE TO RELATED APPLICATION

This application claims priority under 35 USC 119 from Japanese Patent application No. 2018-005009 filed on Jan. 16, 2018, the disclosure of which is incorporated by reference herein in its entirety.

BACKGROUND

Technical Field

The present disclosure relates to a vehicular pillar structure.

Related Art

Japanese Patent Application Laid-Open (JP-A) No. 2013-112077 discloses a car body side structure. In a technology according to JP-A No. 2013-112077, a front pillar includes two structural members separated in the forward-backward direction of a vehicle, and the two structural members are bridged with a transparent member. Accordingly, a driver can view an object across the front pillar, through the transparent member from between the two structural members.

In the case of the car body side structure disclosed in JP-A No. 2013-112077, a peripheral portion of the transparent member is provided with a molding that bridges a gap between the peripheral portion and another component and prevents infiltration of water into an interior. Further, commonly, an attachment member for fixing the transparent member to the structural members is required. On the other hand, a front windshield glass attached to the front pillar also requires a molding that bridges a gap between the front windshield glass and another component. In other words, the number of components may be greatly increased by disposing the transparent member in the front pillar. Accordingly, the technology according to JP-A No. 2013-112077 is susceptible to improvement in this respect.

SUMMARY

In the present disclosure, a vehicular pillar structure capable of achieving both of security of wide visibility in driving of a vehicle and suppression of an increase in the number of components is obtained.

A first aspect of the present disclosure is a vehicular pillar structure including: a first pillar which configures a part of a front pillar and extends along a generally upward and downward direction of a vehicle, and to which a front windshield glass is bonded; a second pillar which configures another part of the front pillar, is arranged on a vehicle rear side at a predetermined spacing with respect to the first pillar, and extends along a generally upward and downward direction of the vehicle; a transparent member bridging between the first pillar and the second pillar, and through which an exterior of the vehicle is visible from a driver side; and a molding which is disposed at at least a peripheral portion on a front windshield glass side of the transparent member and includes a bond portion that attaches the transparent member to at least the first pillar, and a closure portion that closes a gap between the transparent member and the front windshield glass.

According to the first aspect, the first pillar which is included in a part of the front pillar, and extends along a generally upward and downward direction of the vehicle, the second pillar which is included in another part of the front pillar, is arranged on the rear side of the vehicle at a predetermined spacing from the first pillar, and extends along a generally upward and downward direction of the vehicle, and the transparent member with which the first pillar and the second pillar are bridged are included. Accordingly, a driver can view an object across the front pillar through the transparent member with which the first pillar and the second pillar are bridged.

The molding is disposed in at least the peripheral portion closer to the front windshield glass in the transparent member. The molding includes the bond portion and the closure portion. The bond portion attaches the transparent member to at least the first pillar. On the other hand, the closure portion closes a gap between the transparent member and the front windshield glass. Accordingly, the molding for attaching the transparent member to a vehicle body can bridge the gap between the front windshield glass and the transparent member and prevent infiltration of water into an interior, and therefore, a need for a molding for a front windshield glass is eliminated.

A second aspect of the present disclosure is the vehicular pillar structure according to the first aspect, wherein the bond portion of the molding attaches the transparent member to the first pillar in a state in which the transparent member is located further toward a vehicle outer side than the front windshield glass.

According to the second aspect, the bond portion of the molding attaches the transparent member to the first pillar in a state in which the transparent member is located at a position closer to the outside of the vehicle than the front windshield glass. Accordingly, a level difference is formed between the front windshield glass and the transparent member, and therefore, the level difference can inhibit liquid adhering on the front windshield glass from flowing to the transparent member.

A third aspect of the present disclosure is the vehicular pillar structure according to the first or second aspect, wherein a surface at a vehicle cabin side of the bond portion of the molding is located on a plane that is generally coplanar with a surface of the front windshield glass, which is attached to the first pillar.

According to the third aspect, a surface, closer to a vehicle interior, of the bond portion of the molding is located on a plane generally coplanar with a surface of the front windshield glass, which is attached to the first pillar. Accordingly, respective bonded surfaces of the first pillar, facing the front windshield glass and the transparent member, can be arranged on planes generally coplanar with each other. In other words, the bonded surfaces do not require any bearing surface. Therefore, a need for a bend portion or the like for forming a bearing surface is eliminated, and therefore, the first pillar is enabled to be thinner (a dimension in a direction orthogonal to a longitudinal direction can be reduced).

A fourth aspect of the present disclosure is the vehicular pillar structure according to any one of the first to third aspects, wherein a trough portion which is opened generally toward a vehicle width direction inner side, and which extends in a generally upward and downward direction of the vehicle, is disposed at the molding.

According to the fourth aspect, the trough portion which is opened to an interior in a generally vehicle-width direction, and which extends in a generally upward and downward direction of the vehicle is disposed, and therefore, liquid adhering on the front windshield glass can be received in the trough portion and can be allowed to flow in a generally upward and downward direction of the vehicle. As a result, liquid can be inhibited from flowing to the transparent member.

The vehicular pillar structure according to the first aspect is capable of achieving both of security of wide visibility in driving of the vehicle and suppression of an increase in the number of components, as described above.

The vehicular pillar structure according to the second aspect enables visibility through the transparent member to be improved.

The vehicular pillar structure according to the third aspect enables wider visibility to be secured.

The vehicular pillar structure according to the fourth aspect enables visibility through the transparent member to be further improved.

BRIEF DESCRIPTION OF THE DRAWINGS

Exemplary embodiments of the present disclosure will be described in detail based in the following figures, wherein.

DETAILED DESCRIPTION

First Embodiment

A first embodiment of a vehicular pillar structure according to the present disclosure will be described below with reference to FIG. 1 and FIG. 2. Arrows FR, OUT, and UP illustrated in each figure indicate the forward direction of the forward-backward direction of a vehicle, the outer direction of the width direction of the vehicle, and the upward direction of the upward and downward direction of the vehicle, respectively.

(Overall Configuration)

Figure 1:
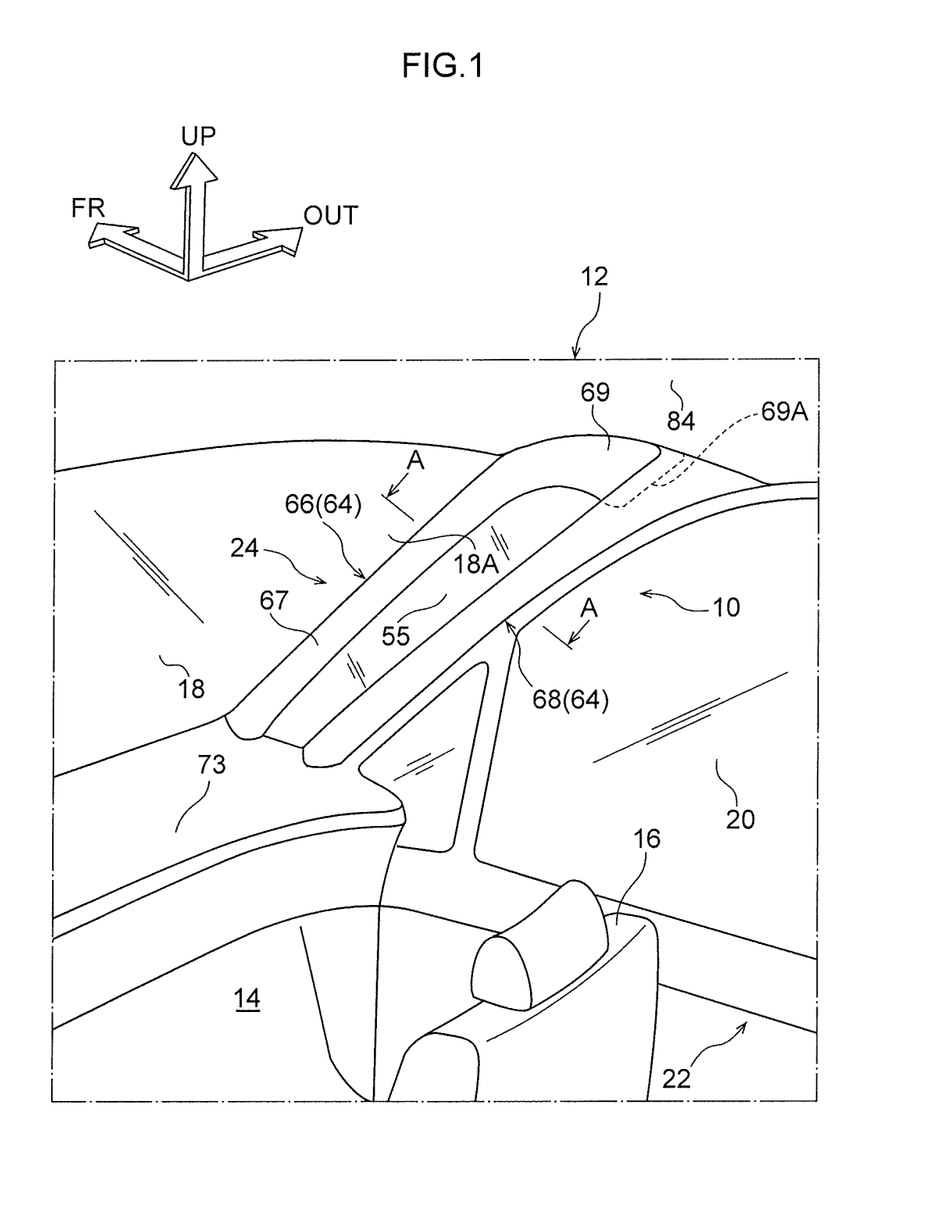
FIG. 1 is a schematic perspective view illustrating the vehicle interior of a vehicle including a vehicular pillar structure according to one embodiment.

As illustrated in FIG. 1, vehicular sheets 16 in a left-and-right pair are disposed in a vehicle front side in an vehicle interior 14 in a vehicle 12 to which a vehicular pillar structure 10 according to the present embodiment is applied, and a driver who is not illustrated can be seated in one of the vehicular sheets 16. The vehicle 12 of the present embodiment is a left-hand drive vehicle as an example, and an illustration of the vehicular sheet 16 in a driver side is omitted in the present figure.

A front windshield glass (hereinafter simply referred to as "front glass") 18 is disposed forwarder in the vehicle than the vehicular sheets 16. The front glass 18 is a transparent window member which separates the inside and outside of the vehicle interior 14, and of which the sheet thickness direction is the generally forward-backward direction of the vehicle. The front glass 18 is more greatly inclined toward the rear side of the vehicle, with being closer to the upper portion of the vehicle, viewed from a side, without illustration. The upper end of the front glass 18 is connected to a front header included in the front end of a roof configured to include a roof panel (each component is not illustrated). The lower end of the front glass 18 is arranged to face, in the forward-backward direction of the vehicle, the rear end of a hood which covers, from above the vehicle, a power unit room disposed in the front side of the vehicle, and is connected to a cowl which extends in the width direction of the vehicle (each component is not illustrated).

The front glass 18 is formed to have a constant sheet thickness, and has a gently curved shape so that the intermediate portion of the front glass 18 in the width direction of the vehicle is convex toward the front side of the vehicle. Respective front pillars 24 are disposed in a left-and-right pair in the outsides of the front glass 18 in the width direction of the vehicle, and in the front sides of the vehicle, of front doors 22 including front side windows 20.

The respective front pillars 24 in a left-and-right pair extend along the ends of the front glass 18 in the width direction of the vehicle so that the generally upward and downward direction of the vehicle is a longitudinal direction. In other words, each of the front pillars 24 in a left-and-right pair is more greatly inclined toward the rear side of the vehicle, with being closer to the upper portion of the vehicle. The front pillar 24 in a passenger side will be described below. However, the front pillar 24 in a side (driver side) opposite to the passenger side also includes a similar configuration.

(First Pillar)

Figure 2:
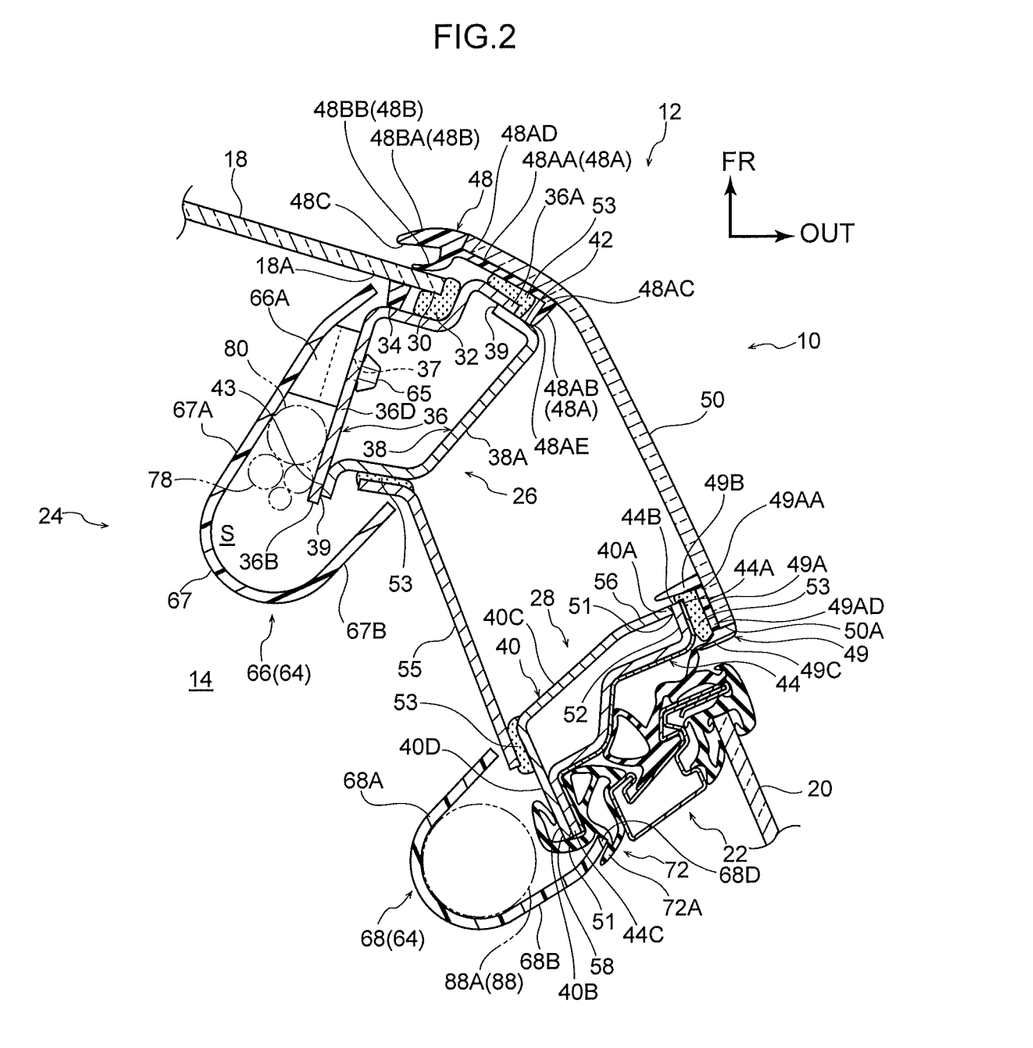
FIG. 2 is an enlarged cross-sectional view illustrating a state taken along the line A-A of FIG. 1.

As illustrated in FIG. 2, the front pillar 24 includes a first pillar 26 and a second pillar 28. The first pillar 26 extends along the generally upward and downward direction of the vehicle. An end 30 of the front glass 18 in the width direction of the vehicle is bonded to the first pillar 26 through a urethane adhesive 32 and a cushion rubber 34. The first pillar 26 includes a first pillar inner panel 36 made of a steel sheet and a first pillar outer panel 38 made of a steel sheet. The cross-sectional shape orthogonal to the longitudinal direction (the extending direction along the generally upward and downward direction of the vehicle) of the first pillar inner panel 36 is a generally crank shape. The cross-sectional shape orthogonal to the longitudinal direction (the extending direction along the generally upward and downward direction of the vehicle) of the first pillar outer panel 38 is a generally U-shape opening toward the inside in the generally width direction of the vehicle. In addition, the first pillar outer panel 38 is configured to form, together with the first pillar inner panel 36, a closed cross section. In other words, the first pillar inner panel 36 is disposed in the front side of the first pillar outer panel 38 in the generally forward-backward direction of the vehicle, so as to face the first pillar outer panel 38. The first pillar outer panel 38 and the first pillar inner panel 36 are bonded to each other through plural welds 39.

In the welds 39, the ends 36A and 36B of the first pillar inner panel 36 in a lateral direction (a direction orthogonal to a longitudinal direction) are put on and welded to flat surfaces 42 and 43 which are planar surfaces in the in-plane direction (of the ends in the lateral direction) of the first pillar outer panel 38, respectively.

(Second Pillar)

The second pillar 28 is arranged in the generally rear side of the vehicle, with respect to the first pillar 26. Specifically, the second pillar 28 is arranged at a predetermined spacing from the first pillar 26 in the generally forward-backward direction of the vehicle. The predetermined spacing is set to not less than a distance between the centers of the pupils of a driver seated in the vehicular sheet 16. "Distance between centers of pupils" refers to a distance between the center of the pupil of the right eye (not illustrated) of the driver and the center of the pupil of the left eye (not illustrated) of the driver. For example, the distance between the centers of the pupils of a Japanese adult is considered to be about 60 to 65 mm. In the present embodiment, the predetermined spacing is set to 65 mm, as an example.

The second pillar 28 extends in generally parallel to the first pillar 26 (along the generally upward and downward direction of the vehicle), and is configured to include a second pillar inner panel 40 made of a steel sheet and a second pillar outer panel 44 made of a steel sheet. The cross-sectional shape orthogonal to the longitudinal direction (the extending direction along the generally upward and downward direction of the vehicle) of the second pillar inner panel 40 is a generally L-shape. The cross-sectional shape orthogonal to the longitudinal direction of the second pillar outer panel 44 is a generally crank shape. In addition, the second pillar outer panel 44 is configured to form, together with the second pillar inner panel 40, a closed cross section. In other words, the second pillar inner panel 40 is disposed in the generally front side of the vehicle, with respect to the second pillar outer panel 44, so as to face the second pillar outer panel 44. The second pillar outer panel 44 and the second pillar inner panel 40 are bonded to each other through plural welds 51.

In one weld 51, an end 40A of the second pillar inner panel 40 in a lateral direction (a direction orthogonal to a longitudinal direction) is allowed to abut on, and is welded to a flat surface 52 which is a planar surface in the in-plane direction of an end 44A of the second pillar outer panel 44 in a lateral direction (a direction orthogonal to a longitudinal direction). As a result, an outer side 56 of the end 40A of the second pillar inner panel 40 and an end face 44B of the end 44A of the second pillar outer panel 44 in the lateral direction are arranged on planes generally coplanar with each other. In the other weld 51, an end 44C of the second pillar outer panel 44 in the lateral direction is put on and welded to a flat wall 40D which is a planar surface of the second pillar inner panel 40. The flat wall 40D extends so that the generally width direction of the vehicle is the sheet thickness direction of the flat wall 40D.

An opening trim 72 is attached to a site, i.e., a flange 58, in which an end 40B of the second pillar inner panel 40 in the lateral direction and the end 44C of the second pillar outer panel 44 in the lateral direction abut on each other. The opening trim 72 is positioned at a position at which the opening trim 72 abuts on the second pillar outer panel 44. A sealing member for the front door 22 can be allowed to abut on the second pillar outer panel 44. The width dimension of each of the first pillar 26 and the second pillar 28 in the state of being viewed from the eye point (not illustrated) of the driver in a generally horizontal direction is set to not more than the distance between the centers of the pupils of the driver.

(Transparent Member)

The first pillar 26 and the second pillar 28 are bridged with a front pillar outer glass 50 as a transparent member through urethane adhesives 53, a molding 48 described later, and a rear side molding 49, from an outside in the generally width direction of the vehicle. The front pillar outer glass 50 is a transparent window member made of glass, of which the sheet thickness direction is the generally width direction of the vehicle. The front pillar outer glass 50 is more greatly inclined toward the rear side of the vehicle, with being closer to the upper portion of the vehicle, viewed from a side. The front pillar outer glass 50 is not limited to glass, and may include a transparent fiber-reinforced resin or the like.

(Molding)

The molding 48 is attached to the front pillar outer glass 50. The molding 48 is made of rubber, as an example. The molding 48 is attached along the generally upward and downward direction of the vehicle, specifically, along a peripheral portion, closer to the front glass 18, of the front pillar outer glass 50. The molding 48 includes a bond portion 48A and a closure portion 48B. The bond portion 48A includes a bond body portion 48AA and a folded portion 48AB. The bond body portion 48AA is a plate-like member bonded to the back surface side of the peripheral portion of the front pillar outer glass 50.

The folded portion 48AB protrudes from an end 48AC, closer to the rear side of the vehicle, of the bond body portion 48AA, toward the vehicle interior 14, and a leading end 48AE abuts on the flat surface 42 of the first pillar outer panel 38. The protrusion amount of the folded portion 48AB is set so that the front pillar outer glass 50 is located at a position closer to the outside of the vehicle than the front glass 18. In other words, a level difference is formed between the front pillar outer glass 50 and the front glass 18.

The urethane adhesive 53 is disposed between the bond portion 48A, and the first pillar outer panel 38 and the first pillar inner panel 36. Through the urethane adhesive 53, the bond portion 48A is fixed to the first pillar 26, and the front pillar outer glass 50 is fixed in turn to the first pillar 26. The urethane adhesive 53 is inhibited from overflowing into the generally rear side of the vehicle by the folded portion 48AB of the bond portion 48A.

The closure portion 48B is disposed on an end 48AD, closer to the front side of the vehicle, of the bond portion 48A. The cross-sectional shape of the closure portion 48B is formed into a generally C-shape opening toward the inside in the generally width direction of the vehicle. In other words, the vehicle front side 48BA of the closure portion 48B protrudes from the peripheral portion of the front pillar outer glass 50 toward the inside in the width direction of the vehicle, continuously with the front pillar outer glass 50. The vehicle rear side 48BB of the closure portion 48B is allowed to abut on the vehicle outer side of the peripheral portion of the front glass 18 in the state of being biased to the vehicle outer side.

A trough portion 48C opening toward the inside in the generally width direction of the vehicle is disposed between the vehicle front side 48BA and vehicle rear side 48BB of the closure portion 48B. The trough portion 48C extends in the generally upward and downward direction of the vehicle along the peripheral portion of the front pillar outer glass 50.

(Rear Side Molding)

The rear side molding 49 is attached to a peripheral portion, closer to the rear side of the vehicle, of the front pillar outer glass 50. The rear side molding 49 is made of rubber, as an example. The rear side molding 49 extends along the generally upward and downward direction of the vehicle. The rear side molding 49 includes a bond body portion 49A as well as folded portions 49B and 49C. The cross-sectional shape orthogonal to the longitudinal direction of the rear side molding 49 is formed into a generally U-shape opening toward the inside in the generally width direction of the vehicle.

The bond body portion 49A is a plate-like member bonded to the back surface side of the peripheral portion of the front pillar outer glass 50. The folded portion 49B protrudes from an end 49AA, closer to the generally front side of the vehicle, of the bond body portion 49A, toward the vehicle interior 14. The folded portion 49B is arranged so as to face one weld 51 of the second pillar inner panel 40 in the generally forward-backward direction of the vehicle. The folded portion 49C protrudes from an end 49AD, closer to the generally rear side of the vehicle, of the bond body portion 49A, toward the vehicle interior 14. The folded portion 49C also protrudes from the end 49AD toward the outside in the generally width direction of the vehicle so as to cover an end face 50A, closer to the generally rear side of the vehicle, of the front pillar outer glass 50.

(Front Pillar Inner Glass)

The first pillar 26 and the second pillar 28 are bridged with a front pillar inner glass 55 from the inside in the generally width direction of the vehicle through the urethane adhesives 53. The front pillar inner glass 55 is a transparent window member of which the sheet thickness direction is the generally width direction of the vehicle. Like the front pillar outer glass 50, the front pillar inner glass 55 is more greatly inclined toward the rear side of the vehicle, with being closer to the upper portion of the vehicle, viewed from a side (see FIG. 1). The front pillar inner glass 55 is not limited to glass, and may include a transparent fiber-reinforced resin or the like.

(Front Pillar Garnish)

A front pillar garnish 64 is disposed in an area closer to the insides of the first pillar 26 and the second pillar 28 in the width direction of the vehicle. The front pillar garnish 64 is made of resin, and is configured to include: a front side garnish 66 disposed in a side, closer to the vehicle interior, of the first pillar 26; and a rear side garnish 68 disposed in a side, closer to the vehicle interior, of the second pillar 28.

As illustrated in FIG. 1, the front side garnish 66 includes: a body portion 67 which extends in the generally upward and downward direction of the vehicle along the first pillar 26 illustrated in FIG. 2; and an extension 69 which is disposed in the upper end of the body portion 67, and extends toward the generally rear side of the vehicle. As illustrated in FIG. 2, plural clip seats 66A and clips 65 attached to the clip seats 66A are disposed on the outer side (back surface) of the body portion 67 in the width direction of the vehicle so that the clip seats 66A and the clips 65 are disposed along a longitudinal direction and are separated from each other (only one clip seat 66A and only one clip 65 are illustrated in FIG. 2). The clip seats 66A are disposed to face an inside wall 36D in the generally width direction of the vehicle, of the first pillar inner panel 36. The front side garnish 66 is attached to the first pillar 26 by inserting each clip 65 attached to each clip seat 66A into a through-hole 37 formed to penetrate, in the sheet thickness direction, the inside wall 36D in the generally width direction of the vehicle. An end, closer to the lower side of the vehicle, of the body portion 67 is inserted into a slot (not illustrated) formed in an instrumental panel 73 illustrated in FIG. 1 (see FIG. 1).

The body portion 67 of the front side garnish 66 is formed into a generally U-shape, of which the cross-sectional shape orthogonal to the longitudinal direction opens toward the outside in the generally width direction of the vehicle, by a first side wall 67A which covers the first pillar inner panel 36 from the front side of the vehicle, and a second side wall 67B which faces the first side wall 67A. An accommodation space S is formed between the first side wall 67A and the first pillar inner panel 36. A wire harness 78 and a hose 80 are routed in the accommodation space S. The second side wall 67B is separated from the vehicle rear side 38A of the first pillar outer panel 38, extends on a plane generally coplanar with the vehicle rear side 38A, and covers, from a side closer to the vehicle interior 14, an attachment portion for attaching the front pillar inner glass 55 to the first pillar 26.

As illustrated in FIG. 1, the extension 69 of the front side garnish 66 is formed integrally with the body portion 67, and an end, closer to the upper side of the vehicle, of the extension 69 abuts on a roof head liner 84. The upper end of the rear side garnish 68 abuts on the rear end 69A of the extension 69 so that the upper end overlaps the rear end 69A.

The rear side garnish 68 extends in the generally upward and downward direction of the vehicle along the second pillar 28 illustrated in FIG. 2. As illustrated in FIG. 2, the cross-sectional shape orthogonal to the longitudinal direction of the rear side garnish 68 is formed into a generally U-shape opening toward the outside in the generally width direction of the vehicle by a first side wall 68A which extends in the generally width direction of the vehicle, and a second side wall 68B which faces the first side wall 68A. The first side wall 68A is separated from the vehicle front side 40C of the second pillar inner panel 40 of the second pillar 28, and extends on a plane generally coplanar with the vehicle front side 40C. The second side wall 68B extends toward the vehicle rear side of the flange 58 and the outside of the flange 58 in the width direction of the vehicle, and an end 68D of the outside of the second side wall 68B in the width direction of the vehicle is disposed so as to overlap a lip 72A of an opening trim 72 in the forward-backward direction of the vehicle.

A clip seat and a tether clip attached to the clip seat (each component is not illustrated) are disposed on the outer side (back surface) of the rear side garnish 68 in the width direction of the vehicle. Specifically, the clip seat and the tether clip are disposed on a site, corresponding to the extension 69 of the front side garnish 66, in the rear side garnish 68. Since the basic configuration of the tether clip is roughly similar to a configuration known in, for example, JP-A No. 2015-202783 or the like, the detailed description of the basic configuration is omitted.

Clip seats 66A having a configuration similar to the configuration of the front side garnish 66, and clips 65 attached to the clip seats 66A are disposed (not illustrated) on the generally intermediate portion in the longitudinal direction of the rear side garnish 68.

The tether clip attached to the clip seat disposed on the rear side garnish 68 is inserted into a through-hole (not illustrated) formed in the second pillar 28. Similarly, the clips 65 attached to the clip seats 66A on the rear side garnish 68 are also inserted into through-holes (not illustrated) formed in the second pillar 28. In the above configuration, the rear side garnish 68 is attached to the second pillar 28. Like the front side garnish 66, an end, closer to the lower side of the vehicle, of the rear side garnish 68 is inserted into a slot (not illustrated) formed in the instrumental panel 73 illustrated in FIG. 1 (see FIG. 1).

(Curtain Air Bag)

A curtain air bag device 88 includes a curtain air bag 88A and an inflator which is not illustrated. The curtain air bag 88A is formed so that gas is supplied from the inflator into the curtain air bag 88A, whereby the curtain air bag 88A is expanded along a side of the vehicle interior to cover the front side window 20 and a center pillar (not illustrated).

In a usual state, the curtain air bag 88A is folded into a long-length shape, and housed (not illustrated), together with the inflator, in a roof side rail disposed on the upper end of the side of the vehicle interior. In such a housing state, the curtain air bag 88A allowed to have a long-length shape is configured to extend from the generally intermediate portion in the longitudinal direction of the second pillar 28 in the front pillar 24 to the upper end side of a rear pillar, which is not illustrated, along the roof side rail. Since the basic configuration of each of such curtain air bags 88A is roughly similar to a configuration known in, for example, JP-A No. 2012-40963 or the like, the detailed description of the basic configuration is omitted.

(Operation of First Embodiment)

The operation of the present embodiment will now be described.

As illustrated in FIG. 1 and FIG. 2, the present embodiment includes: the first pillar 26 which is included in a part of the front pillar 24, and extends along the generally upward and downward direction of the vehicle; the second pillar 28 which is included in the other part of the front pillar 24, arranged in the rear side of the vehicle at a predetermined spacing from the first pillar 26, and extends along the generally upward and downward direction of the vehicle; and the front pillar outer glass 50 with which the first pillar 26 and the second pillar 28 are bridged. Accordingly, a driver can view an object across the front pillar 24 through the front pillar outer glass 50 with which the first pillar 26 and the second pillar 28 are bridged.

The molding 48 is disposed on at least the peripheral portion, closer to the front glass 18, of the front pillar outer glass 50. The molding 48 includes the bond portion 48A and the closure portion 48B. The front pillar outer glass 50 is attached to the first pillar 26 through the bond portion 48A. The closure portion 48B closes the gap between the front pillar outer glass 50 and the front glass 18. Accordingly, the molding 48 for attaching the front pillar outer glass 50 to a vehicle body enables the gap between the front glass 18 and the front pillar outer glass 50 to be bridged, and enables the infiltration of water into the interior to be prevented. Therefore, the need for a molding for the front glass 18 is eliminated. As a result, both of the security of wide visibility in driving of a vehicle and suppression in an increase in the number of components can be achieved.

The front pillar outer glass 50 is attached to the first pillar 26 through the bond portion 48A of the molding 48 in a state in which the front pillar outer glass 50 is located at a position closer to the outside of the vehicle than the front glass 18. Accordingly, a level difference is formed between the front glass 18 and the front pillar outer glass 50, and therefore, the level difference can inhibit liquid adhering on the front glass 18 from flowing to the front pillar outer glass 50. As a result, visibility through the front pillar outer glass 50 can be improved.

Since the trough portion 48C which opens toward the inside in the generally width direction of the vehicle, and extends in the generally upward and downward direction of the vehicle is disposed, a liquid such as washer fluid adhering on the front glass 18 can be received in the trough portion 48C, and can be allowed to flow in the generally upward and downward direction of the vehicle. As a result, the liquid can be inhibited from flowing to the front pillar outer glass 50. As a result, visibility through the front pillar outer glass 50 can be further improved.

Second Embodiment

A vehicular pillar structure according to a second embodiment of the present disclosure will now be described with reference to FIG. 3. The same components as the components of the first embodiment and the like, described above, are denoted by the same reference characters, and description thereof is omitted.

The basic configuration of the vehicular pillar structure 101 according to the second embodiment is similar to the basic configuration in the first embodiment. The vehicular pillar structure 101 has a feature in that a surface 110AA, closer to a vehicle interior 14, of the bond portion 110A of a molding 110 is located on a plane generally coplanar with a surface 18A of a front glass 18, which is attached to a first pillar 102.

(First Pillar)

Figure 3:
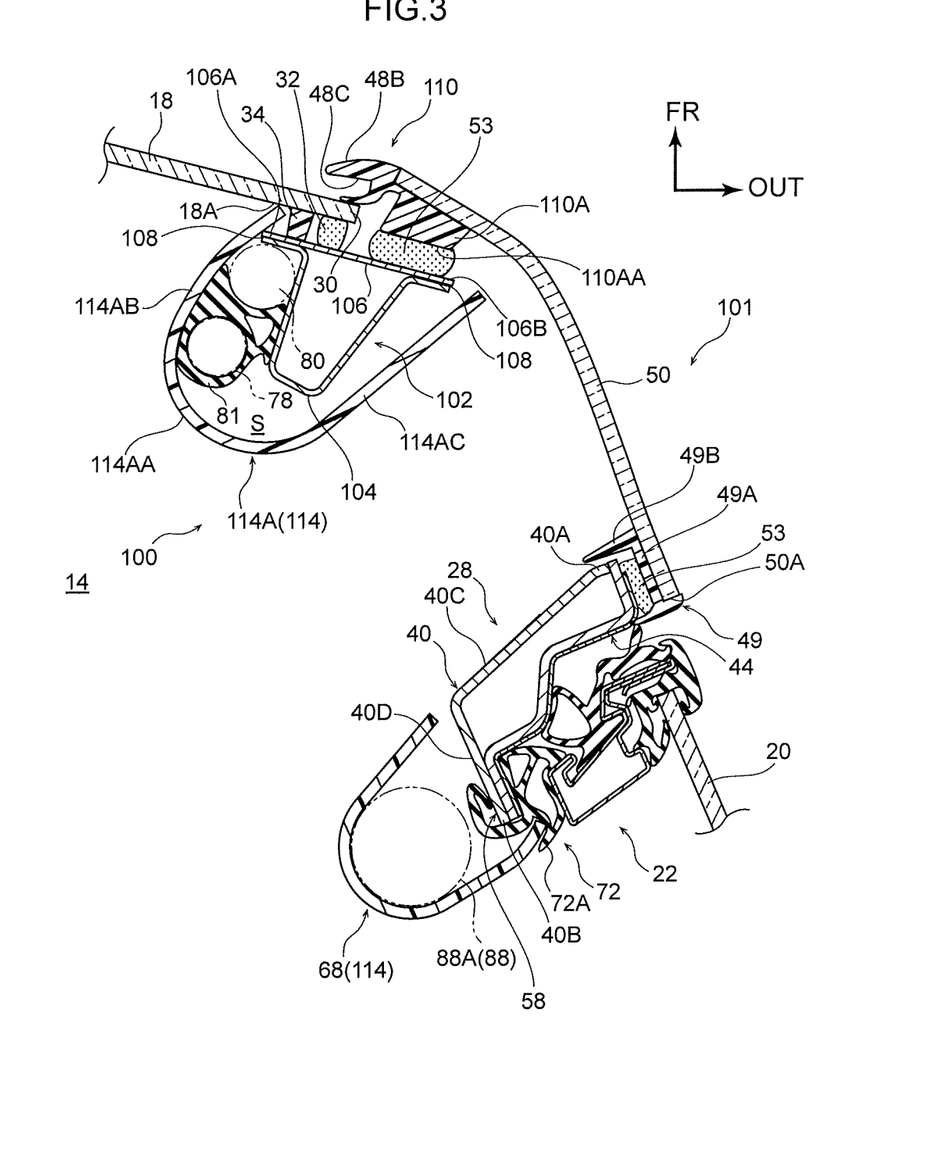
FIG. 3 is an enlarged cross-sectional view that illustrates a principal part of a front pillar including a vehicular pillar structure according to a second embodiment, and that corresponds to FIG. 2.

In other words, a front pillar 100 includes the first pillar 102 and a second pillar 28, as illustrated in FIG. 3. The first pillar 102 extends along the generally upward and downward direction of a vehicle. An end 30 of the front glass 18 in the width direction of the vehicle is bonded to a first pillar outer panel 106 as a bonded surface, described later, of the first pillar 102 through a urethane adhesive 32 and a cushion rubber 34. The first pillar 102 is configured to include a first pillar inner panel 104 made of a steel sheet and the first pillar outer panel 106 made of a steel sheet. The first pillar outer panel 106 is formed into a generally flat plate shape.

The first pillar inner panel 104 is configured to have a generally hat shape of which the cross-sectional shape orthogonal to the longitudinal direction (the extending direction along the generally upward and downward direction of the vehicle) opens toward the generally front side of the vehicle, and to form, together with the first pillar outer panel 106, a closed cross section. In other words, the first pillar outer panel 106 is disposed to face the generally front side of the vehicle, of the first pillar inner panel 104, and the first pillar inner panel 104 and the first pillar outer panel 106 are bonded to each other through plural welds 108.

In the respective welds 108, the ends 106A and 106B of the first pillar outer panel 106 in a lateral direction are put on and welded to the first pillar inner panel 104.

(Transparent Member)

The first pillar 102 and the second pillar 28 are bridged with a front pillar outer glass 50 as a transparent member through urethane adhesives 53, the molding 110 described later, and a rear side molding 49 from the outside in the generally width direction of the vehicle.

(Molding)

The molding 110 is attached to the front pillar outer glass 50. The molding 110 is made of rubber as an example, is attached along the generally upward and downward direction of the vehicle, specifically along a peripheral portion, closer to the front side of the vehicle, of the front pillar outer glass 50, and includes the bond portion 110A and a closure portion 48B. The bond portion 110A protrudes toward the vehicle interior 14 so that the surface 110AA, closer to the vehicle interior 14, of the bond portion 110A is located on a plane generally coplanar with the surface 18A (attached to the first pillar 102), closer to the vehicle interior 14, of the front glass 18. In other words, the cross-sectional shape orthogonal to the longitudinal direction of the bond portion 110A is formed into a generally trapezoid shape of which the thickness in the generally forward-backward direction of the vehicle is decreased with being closer to the outside in the generally width direction of the vehicle.

The urethane adhesive 53 is disposed between the bond portion 110A and the first pillar outer panel 106. Through the urethane adhesive 53, the bond portion 110A is fixed to the first pillar outer panel 106 (the first pillar 102), and the front pillar outer glass 50 is fixed in turn to the first pillar outer panel 106 (the first pillar 102).

(Front Pillar Garnish)

A front pillar garnish 114 is disposed in an area closer to the insides of the first pillar 102 and the second pillar 28 in the width direction of the vehicle. This front pillar garnish 114 is made of resin, and is configured to include: a front side garnish 114A disposed in a side, closer to the vehicle interior, of the first pillar 102; and a rear side garnish 68 disposed in a side, closer to the vehicle interior, of the second pillar 28.

In the front side garnish 114A, plural clip seats and clips attached to the clip seats (each component is not illustrated) are disposed on the outer side (back surface), in the width direction of the vehicle, of a body portion 114AA which extends along the first pillar 102 in the generally upward and downward direction of the vehicle so that the clip seats and the clips are disposed along a longitudinal direction and are separated from each other. The front side garnish 114A is attached to the first pillar 102 by inserting each clip attached to each clip seat into a through-hole (not illustrated) formed in the first pillar 102. An end, closer to the lower side of the vehicle, of the body portion 114AA is inserted into the slot (not illustrated) formed in the instrumental panel 73 illustrated in FIG. 1 (see FIG. 1).

The body portion 114AA of the front side garnish 114A is formed into a generally U-shape, of which the cross-sectional shape orthogonal to the longitudinal direction opens toward the outside of the generally width direction of the vehicle, by a first side wall 114AB which covers the first pillar inner panel 104 and the first pillar outer panel 106 from the front side of the vehicle, and a second side wall 114AC which faces the first side wall 114AB. An accommodation space S is formed between the first side wall 114AB and the first pillar inner panel 104. A retention member 81 which retains a wire harness 78 and a hose 80 is disposed in the accommodation space S.

(Operation of Second Embodiment)

The operation of the second embodiment will now be described.

The effects of the configuration described above, similar to those of the first embodiment, can also be obtained because the configuration described above is the same as the configuration of the vehicular pillar structure 10 according to the first embodiment except that the surface 110AA, closer to the vehicle interior 14, of the bond portion 110A of the molding 110 is located on a plane generally coplanar with the surface 18A of the front glass 18, which is attached to the first pillar 102. The surface, closer to the vehicle interior 14, of the bond portion 110A of the molding 110 is located on a plane generally coplanar with the surface 18A of the front glass 18, which is attached to the first pillar 102. Accordingly, the first pillar outer panel 106 facing each of the front glass 18 and the front pillar outer glass 50 can be arranged on planes generally coplanar with each other in the first pillar 102. In other words, the first pillar outer panel 106 requires no bearing surface. Therefore, the need for a bend portion or the like for forming a bearing surface is eliminated in the first pillar outer panel 106, and therefore, the first pillar 102 is enabled to be thinner (the dimension of the first pillar 102 in a direction orthogonal to a longitudinal direction can be reduced). As a result, wider visibility can be secured.

Figure 4:
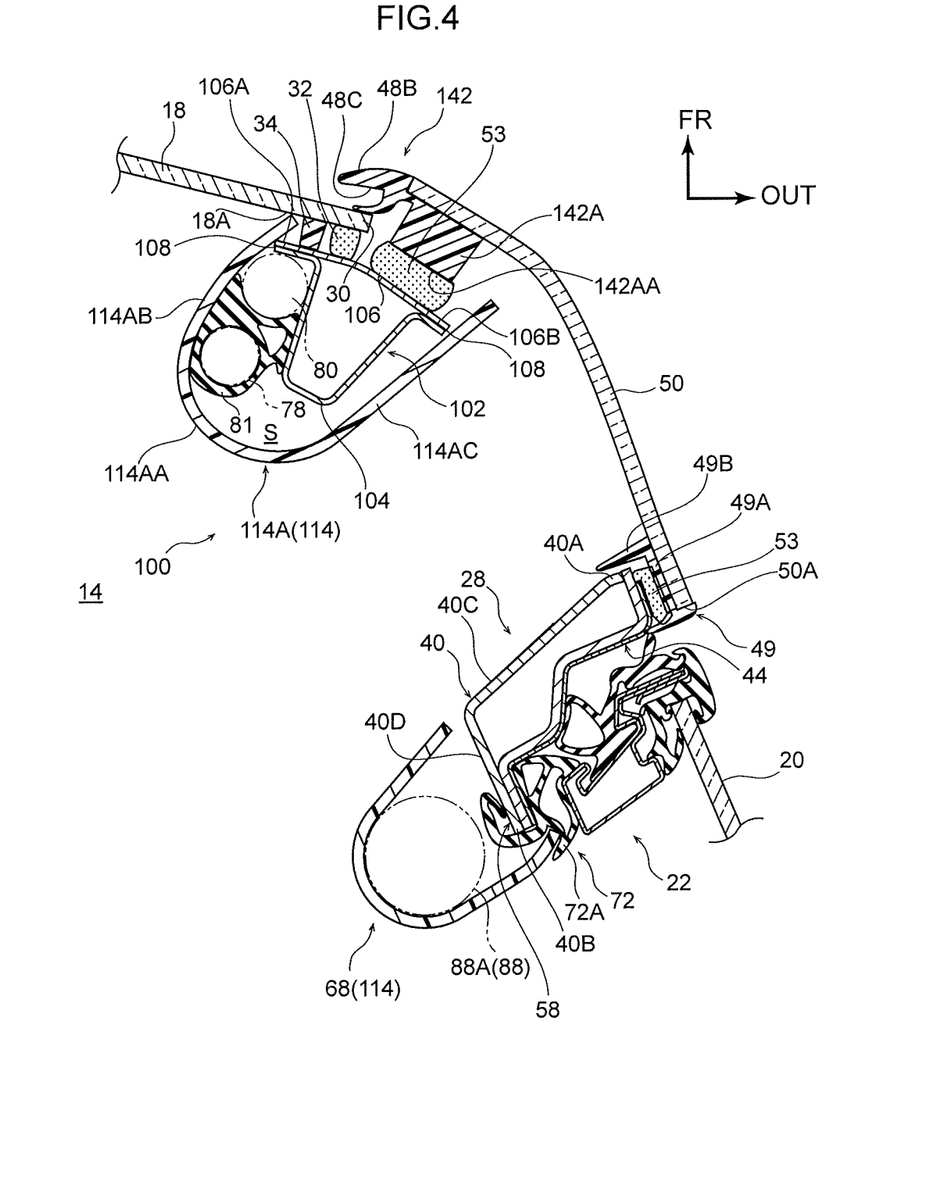
FIG. 4 is an enlarged cross-sectional view that illustrates a principal part of a front pillar including a vehicular pillar structure according to an alternative example of the second embodiment, and that corresponds to FIG. 2.

In the embodiment described above, the surface 110AA, closer to the vehicle interior 14, of the bond portion 110A of the molding 110 is located on a plane generally coplanar with the surface 18A of the front glass 18, which is attached to the first pillar 102, but without limitation thereto. As illustrated in FIG. 4, a configuration in which a surface 142AA of a bond portion 142A of a molding 142 is formed at a certain angle with respect to a surface 18A of a front glass 18 is also acceptable. In other words, a first pillar outer panel 140 is more greatly inclined toward the rear side of a vehicle, with being closer to the outside of the generally width direction of the vehicle. The first pillar outer panel 140 is greatly inclined in a portion closer to the outside in the generally width direction of the vehicle than a generally central portion in the generally width direction of the vehicle. The surface 142AA of the bond portion 142A of the molding 142 is generally parallel to the portion closer to the outside in the generally width direction of the vehicle than the generally central portion in the generally width direction of the vehicle, in the first pillar outer panel 140. In other words, a peripheral portion, closer to the front side of the vehicle, of a front pillar outer glass 50, and a site of the first pillar outer panel 140, corresponding to the peripheral portion, are generally parallel to each other, and therefore, the cross-sectional shape of the bond portion 142A of the molding 142 has a simple shape which is a generally rectangular shape. As a result, the molding 142 is easily applied to other vehicle types and the like.

The embodiments of the present disclosure have been described above. However, it will be appreciated that the present disclosure is not limited to the embodiments, and various changes of the embodiments, different from the embodiments, can be made without departing from the gist of the present disclosure.

What is claimed is:

1. A vehicular pillar structure comprising:
a first pillar which configures a part of a front pillar and extends along a generally upward and downward direction of a vehicle, and to which a front windshield glass is bonded;
a second pillar which configures another part of the front pillar, is arranged on a vehicle rear side at a predetermined spacing with respect to the first pillar, and extends along a generally upward and downward direction of the vehicle;
a transparent member bridging between the first pillar and the second pillar, and through which an exterior of the vehicle is visible from a driver side; and
a molding which is disposed at at least a peripheral portion on a front windshield glass side of the transparent member and includes a bond portion that attaches the transparent member to at least the first pillar, and a closure portion that closes a gap between the transparent member and the front windshield glass.

2. The vehicular pillar structure according to claim 1, wherein
the bond portion of the molding attaches the transparent member to the first pillar in a state in which the transparent member is located further toward a vehicle outer side than the front windshield glass.

3. The vehicular pillar structure according to claim 1, wherein
a surface at a vehicle cabin side of the bond portion of the molding is located on a plane that is generally coplanar with a surface of the front windshield glass, which is attached to the first pillar.

4. The vehicular pillar structure according to claim 1, wherein
a trough portion which is opened generally toward a vehicle width direction inner side, and which extends in a generally upward and downward direction of the vehicle, is disposed at the molding.

* * * * *